US006378288B1

(12) United States Patent
Towfighi et al.

(10) Patent No.: US 6,378,288 B1
(45) Date of Patent: Apr. 30, 2002

(54) COMBUSTION-ENGINED TOOL WITH AN INCREASED VELOCITY OF THE EXPANDING FLAME FRONT IN THE FORE-CHAMBER OF THE TOOL COMBUSTION CHAMBER

(75) Inventors: Kaveh Towfighi, Sigmarszell; Harald Fielitz, Lindau, both of (DE); Wolfgang Saxler, Gurtis (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/784,410

(22) Filed: Feb. 13, 2001

(30) Foreign Application Priority Data

Feb. 17, 2000 (DE) ........................................ 100 07 211

(51) Int. Cl.$^7$ ................................................ F02C 5/00

(52) U.S. Cl. ...................... 60/39.6; 123/46 R; 123/590; 123/593; 123/263

(58) Field of Search ................ 60/39.6, 597; 123/46 R, 123/46 S, 46 C, 46 H, 590, 593, 306, 309, 262, 263

(56) References Cited

U.S. PATENT DOCUMENTS

| | | | | | |
|---|---|---|---|---|---|
| 4,442,807 | A | * | 4/1984 | Latsch et al. | 123/263 |
| 4,513,708 | A | * | 4/1985 | Latsch et al. | 123/263 |
| 4,766,861 | A | * | 8/1988 | Finsterwalder | 123/254 |
| 4,987,868 | A | * | 1/1991 | Richardson | 123/263 X |

* cited by examiner

*Primary Examiner*—Hoang Nguyen
(74) *Attorney, Agent, or Firm*—Sidley Austin Brown & Wood, LLP

(57) ABSTRACT

A combustion-engined tool including two opposite combustion chamber walls (14,18), and an ignition device (52) arranged between the two opposite combustion chamber walls for igniting a fuel gas mixture occupying space between the two walls, and an element located between the ignition device (52) and openings (38) formed in one of the two walls (18) for localized swirling a laminary expanding flame front formed upon ignition of the fuel gas mixture with the ignition device (52).

15 Claims, 4 Drawing Sheets

Fig. 4
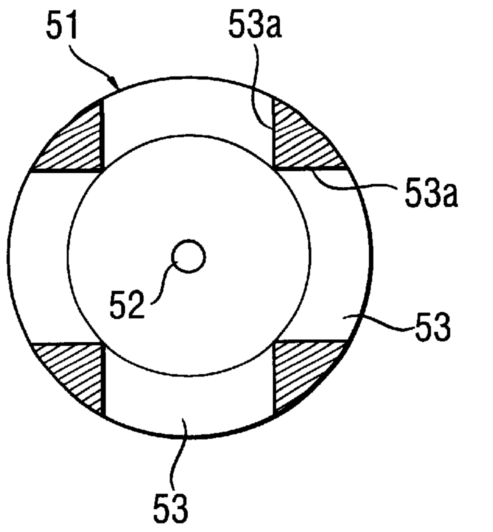
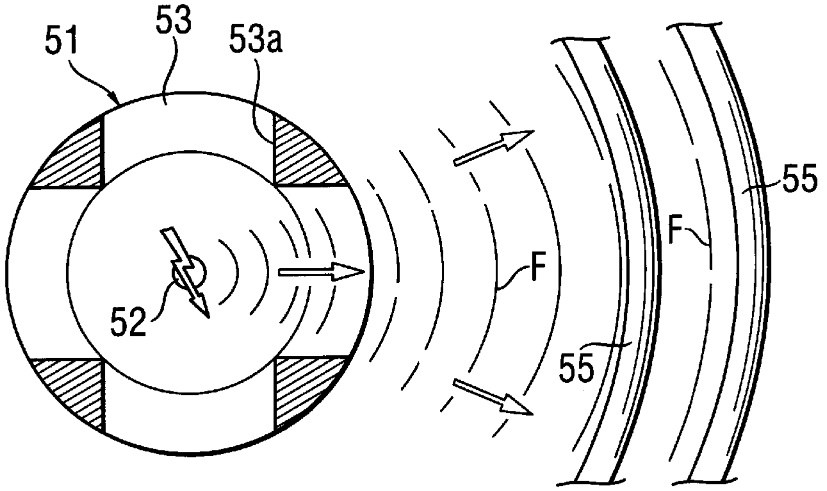
Fig. 5
Fig. 6
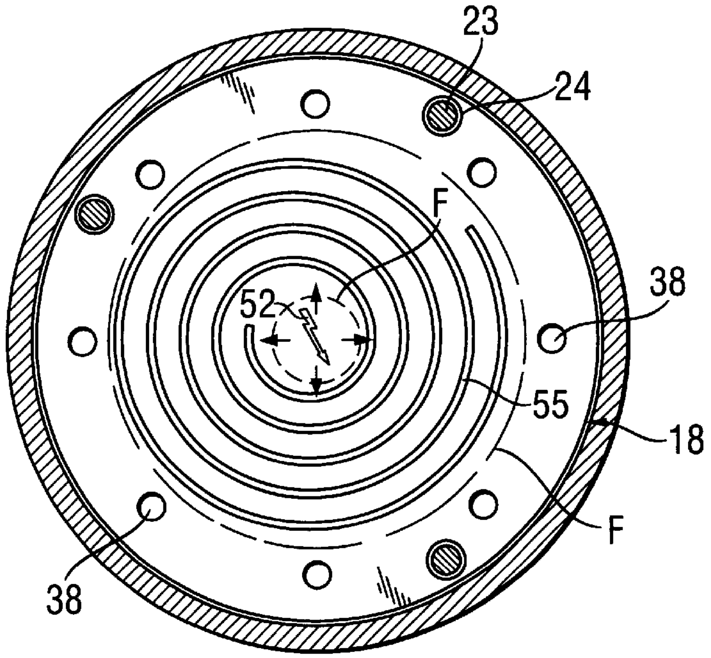

COMBUSTION-ENGINED TOOL WITH AN INCREASED VELOCITY OF THE EXPANDING FLAME FRONT IN THE FORE-CHAMBER OF THE TOOL COMBUSTION CHAMBER

BACKGROUND OF THE INVENTION

1. Field of the Invention

The present invention relates to a combustion-engined tool including two opposite combustion chamber walls, and an ignition device arranged between the two opposite combustion chamber walls for igniting a fuel gas mixture occupying space between the two walls, with one of the two walls having a plurality of openings spaced from the ignition device.

2. Description of the Prior Art

A setting tool for driving in of fastening elements can serve as an example of a tool described above. Such setting tool is disclosed in German Publication No. 199 50 351. The setting tool disclosed in this German Publication includes two, extending parallel to each other, combustion chamber walls and an ignition device arranged between the two walls for igniting a combustible fuel gas mixture filling the space between the two walls, such as air-fuel gas mixture, oxigen-fuel gas mixture, or any other suitable combustible gas mixture. A cage is provided between the two walls in which the ignition device is housed. The cage has a plurality of openings formed in the circumferential wall of the cage, and one of the combustion chamber wall has a plurality of openings spaced from the cage.

The combustion starts when the available fuel gas mixture is ignited with the ignition device, and a flame front, which exits the cage, begins to laminary expand over the volume of the combustion chamber with a certain velocity. The flame front pushes the unconsumed fuel gas mixture in front of it, with the gas mixture flowing through the openings formed in the one of the combusting chamber walls from the fore-chamber, which is defined by the two walls, into another chamber adjacent to the wall provided with the openings, which adjacent chamber is called a main chamber. The gas mixture penetrating into the main chamber causes there turbulence and pre-compression. When the flame front reaches the openings, the flame penetrates through the rather narrow openings in an accelerated manner in form of flame jets into the main chamber, causing their a further turbulence. The intermixed gas-air mixture in the main chamber is ignited over the entire surface of the flame jets. It bums with a high velocity which noticeably increases the effectiveness of the combustion, insuring that cooling-down losses remain small.

If the laminar flame front in the fore-chamber after ignition propagates with a relatively low speed, a comparatively long time passes between the ignition and beginning of combustion in the main chamber, which leads to high cooling-down losses. Because of slow combustion in the fore-chamber, on the other hand, the piston starts to move prematurely, before the pressure reaches its maximum and, therefore, means for retaining the piston in its initial position until the pressure reaches its maximum, need be provided. With slow combustion and conversion of the fuel gas mixture in the fore-chamber, the flame jets, which penetrate into the main chamber, do not generate in the main chamber, upon penetrating thereinto, a sufficient by high turbulence.

Accordingly, the object of the present invention is to provide a combustion-engined tool of the type described above in which a high velocity of the flame front in the fore-chamber in insured.

SUMMARY OF THE INVENTION

This and other objects of the present invention, which will become apparent hereinafter, are achieved by providing, between the ignition device and the openings in the combustion chamber wall separating the fore-chamber from the main chamber, means for localized swirling of the laminary expanding flame front formed in the fore chamber upon ignition of the fuel gas mixture with the ignition device.

The swirling device forms an obstruction in the fore-chamber in the path of propagation of the flame front, circumfluenting the same. As a result of interaction of the flame front with the obstruction, portions of the flame front are reflected from the obstacle or are deviated thereby, forming new flame front portions which increase the conversion rate of the fuel gas mixture. As a result, a localized turbulent combustion of the fuel gas mixture takes place, which results in a more rapid combustion of the entire gas mixture in the fore-chamber, which increases the propagation velocity of the laminar flame front. As a result, the cooling-down losses remain small. The flame jets, which penetrate into the main chamber are now capable to generate a sufficient turbulence when entering the main chamber. Therefore, the maximum pressure in the main chamber is obtained more rapidly, and the piston retaining means is not any more necessary.

The device for localized swirling of the ignited fuel-gas mixture in the fore-chamber can be formed as a separate, self-containing element, or be formed as additional structural components provided between the two walls. The swirling device can be formed, at least partially of wire, in particular, of a fine wire, in order to form simple, localized swirls. The swirling device can be formed, e.g., as a spring surrounding the ignition device and supported, at its opposite ends, against the two walls, respectively. As a spring, a helical spring can be used the advantage of which consists in that, upon collapsion of the combustion chamber, it can be compressed to a most possible extent, facilitating collapsing of the combustion chamber. Preferably, the spring is formed as a compression spring supported against the combustion chamber walls. In the compression spring, the distance between separate windings of the spring remains substantially the same which provides for a uniform distribution of the obstruction over the fore-chamber volume, which is circumfluented by the laminar flame front. This leads to a uniform conversion, as a result of the equipartition, of the fuel gas mixture.

Instead of a spring, the swirling device can be formed as a wire basket, which is formed of fine wire, with the bars extending perpendicular to the combustion chamber wall, and the like.

According to one of the embodiment of the invention, the device for swirling the flame front in the fore-chamber can be formed of structural elements associated with one or both combustion chamber walls. These structural elements can be formed as elements of facing each other surfaces of the two walls, e.g., as projections or recesses. The device-forming structural elements can be formed as steps provided in respective surfaces of the two walls. The surface elements of the two walls, which form the swirling device, can be arranged concentrically with the ignition device. Advantageously, the surface structural elements of the two wall are inversely arranged, so that the two wall can abut each other upon collapsing of the combustion chamber. In this case the projections on the surface of one of the wall would engage in the recesses formed in another of the walls, so that the walls can lie on each other.

The ignition device itself can be formed, e.g., of a pair of electrodes projecting into the fore-chamber. They are not necessarily need be surrounded by a cage. However, a cage can be used for housing the ignition device or the electrodes. When a cage is used, the swirling device is located outside of the cage, surrounding the cage and being spaced therefrom, a particularly high velocity of the flame front or the laminar flow is achieved.

It proved to be advantageous when the openings in the circumferential wall of the cage are angularity equidistantly spaced. The angularly equidistant spacing of the cage openings provides for symmetrical expansion of the laminar flame front in the fore-chamber to a most possible extent, and provides for symmetrical swirls of the flame front. This results in an overall improvement of the efficiency of combustion.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 4 a cross-sectional view line A—A in FIG. 3*a;*

FIG. 5 a cross-sectional view along line A—A in FIG. 3*a* upon ignition; and FIG. 6 a plan view of the separation plate of the combustion chamber upon ignition, with the ignition device cage being removed.

DETAILED DESCRIPTION OF THE PREFERRED EMBODIMENT

Figure 1:
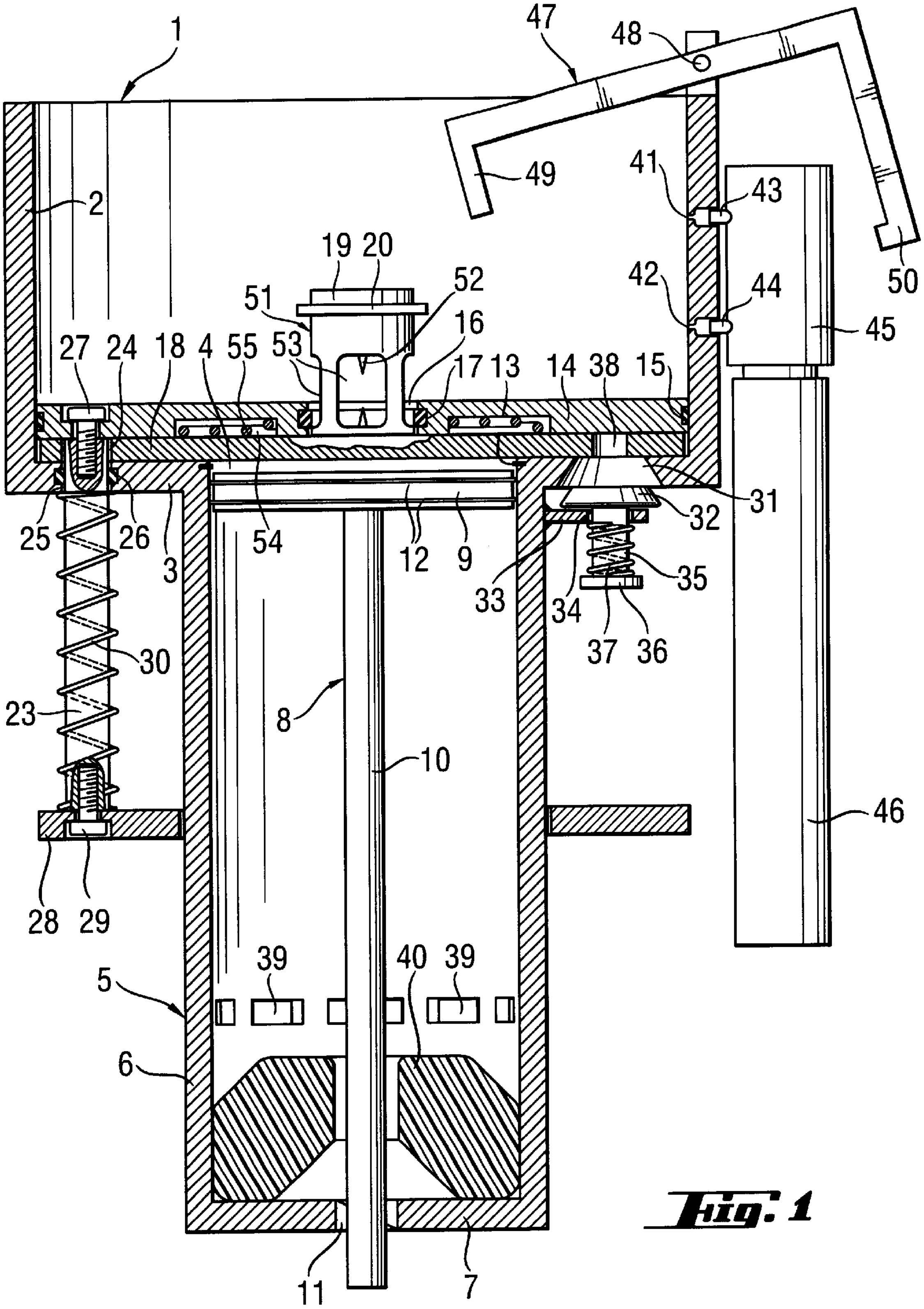
FIG. 1 an axial cross-sectional view of an internal combustion-engined tool with a collapsed combustion chamber.

FIG. 1 shows a cross-sectional view of an internal combustion engined-setting tool for setting fastening elements in the region of the tool combustion chamber. As shown in FIG. 1, the setting tool has a cylindrical combustion chamber 1 with a cylindrical wall 2 and an annular bottom 3 with a central opening 4. A guide cylinder 5, which has a cylindrical wall 6 and a bottom 7, adjoins the opening 4 in the bottom 3 of the combustion chamber 1. A piston 8 is displaceably arranged in the guide cylinder 5. The piston 8 consists of a piston plate 9 facing the combustion chamber 1 and a piston rod 10 extending from the center of the piston plate 9. The piston rod 10 projects through an opening 11 formed in the bottom 7 of the guide cylinder 5.

FIG. 1 shows a non-operational position of the setting tool in which the piston 8 is in its rearward off-position. The side of the piston plate 9 adjacent to the bottom 3 of the combustion chamber 1 is located closely adjacent to the bottom 3, with the piston rod 10 projecting only slightly beyond the bottom 7 of the guide cylinder 5. For sealing the cylinder chambers on opposite sides of the piston plate 9 from each other, sealing rings 12, 13 are provided on the outer circumference of the piston plate 9.

Inside of the combustion chamber 1, there is provided a cylindrical plate 14 further to be called a movable combustion chamber wall or movable wall. The movable wall 14 is displaceable in the longitudinal direction of the combustion chamber 1. For separating the chambers on opposite sides of the movable wall 14, an annular sealing 15 is provided on the circumference of the movable wall 14. The movable wall 14 has a central opening 16, with an annular sealing 17 provided in the wall of the opening 16.

Between the movable wall 14 and the annular bottom 3 of the combustion chamber 1, there is provided a further movable wall formed by a separation plate 18. The separation plate 18 has a circular shape and an outer diameter corresponding to the inner diameter of the combustion chamber. The side of the separation plate 18 adjacent to the movable wall 14 is provided with a cylindrical lug 19 that projects through the central opening 16 in the movable wall 14. The length of the lug 19 exceeds the thickness of the movable wall 14 in several times. The circumferential or annular sealing 17 sealingly engages the outer circumference of the cylindrical lug 19. At its free end, the cylindrical lug 19 is provided with a shoulder 20 the outer diameter of which exceeds the outer diameter of the lug 19 and the inner diameter of the opening 16 of the movable wall 14. Thus, upon moving away from the bottom 3 of the combustion chamber 1, the movable wall 14, in a while, engages the shoulder 20 of the lug 19 and lifts the separation plate 18 with it. Thus, the movable wall 14 and the separation plate 15 become spaced a predetermined distance which is determined by the position of the shoulder 20. In this way, the movable wall 14 and the separation plate 18 form a so called fore-chamber, which forms a partial combustion chamber of the combustion chamber 1. The fore-chamber is designated with a reference numeral 21 and is clearly shown in FIG. 2. After the movable wall 14 engages the shoulder 20, the movable wall 14 and the separation plate 18 are displaced together, and a further partial combustion chamber is formed between the separation plate 18 and the bottom 3 and/or the piston plate 9. This further chamber forms a main chamber. It is designated with a reference numeral 22 and is likewise clearly shown in FIG. 2.

For displacing the movable wall 14, there are provided several, e.g., three drive rods 23 uniformly distributed along the circumference of the movable wall 14 and fixedly connected therewith. Only one of the drive rods 23 is shown in FIG. 1. The drive rods 23 extend parallel to the axis of the combustion chamber 1 and outside of the cylindrical wall 6 of the guide cylinder 5. The drive rods 23 extend through openings 24, respectively, formed in the separation plate 18 and through corresponding openings 25 formed in the bottom 3 of the combustion chamber 1. Each of the openings 25 is provided with a circumferential seal 26 located in the surface defining the opening 25 for sealing the combustion chamber 1 from outside. The movable wall 14 is connected with drive rods 23 by, e.g., screws 27 which extend through the movable wall 14 and are screwed into the drive rods 23. The free ends of the drive rods 23 are connected with each other by a drive ring 28 which is arranged concentrically with the combustion chamber axis and which circumscribes the guide cylinder 5. The drive ring 28 is connected with the drive rods 23 by screws 29 which extend through the drive ring 28 and are screwed into the drive rods 23 through end surfaces of the free ends of respective drive rods 23. Each of the drive rods 23 supports a compression spring 30 extending between the bottom 3 of the combustion chamber 1 and the drive ring 28. The compression springs 30 are designed for pulling the movable wall 14 toward the bottom 3.

In the region of the bottom of the combustion chamber 1, there is further provided a ventilation opening 31 into which a valve tappet 32 is sealingly extendable. With the ventilation opening 31 being open, the valve tappet 32 is located outside of the combustion chamber 1 or beneath the bottom 3 of the combustion chamber 1. The valve tappet 32 is supported outside of the combustion chamber 1 by a shoulder 33 secured on the guide cylinder 5. The shoulder 33 has an opening 34 through which a stub 35, which is secured to the bottom side of the valve tappet 32, extends. At the free end of the stub 35, there is provided a shoulder 36, and a compression spring 37 is arranged between the shoulder 36 and the shoulder 33. The compression spring 37 is designed for pulling the valve tappet 32 toward the shoulder 33 to keep the ventilation opening 31 open. The cylindrical stub 35 lies in the displacement path of the drive ring 28 and is impacted by the drive ring 28 when the later is displaced toward the bottom 3 of the combustion chamber 1. At a predetermined axial position, the drive ring 28 engages the stub 35 pushing it upward, so that the valve tappet 32 closes the ventilation opening 31.

A plurality of further openings 38 are distributed over the circumference of the separation plate 18 at the same distance from the combustion chamber axis. In the lower end of the guide cylinder 5, there are formed a plurality of outlet openings 39 for evacuating air from the guide cylinder 5 when the piston 8 is displaced toward the bottom 7 of the guide cylinder 5. At the lower end of the guide cylinder 5, there is provided damping means 40 for damping the movement of the piston 8. When the piston 8 passes past the openings 39, an exhaust gas can escape through the openings 39.

Two radial, axially spaced openings 41 and 42 are formed in the cylindrical wall 2 of the combustion chamber 1. Two outlet nipples 43, 44 extend into the radial openings 41, 42, respectively, from outside. The nipples 43, 44 form part of metering valves (not shown in detail) of a metering head 45. A liquefied fuel gas is delivered to metering valves located in the metering head 45 from a bottle 46. The metering valves provide for flow of a predetermined amount of the liquefied fuel gas through the outlet nipples 43, 44 when the metering head 45 is pressed against the cylindrical wall 2 of the combustion chamber 1, and the outlet nipples 43, 44 are pushed inward, opening the respective metering valves. To provide for the inward movement of the outlet nipples 43, 44, the radial openings 41, 42 narrow toward the interior of the combustion chamber 1, providing stops for the outlet nipples 43, 44. The pressing of the metering head 45 against the cylindrical wall 2 is effected with a stirrup 47 pivotable at a hinge point 48 on the cylindrical wall 2. One end 49 of the stirrup 47 is impacted by the movable wall 14, and the stirrup is pivoted in such a way that its another end 50 is pressed against the metering head 45 to press the later toward the cylindrical wall 2. The movable wall 14 engages the end 49 of the stirrup 47 shortly before the partial chamber 21 reaches its end position. The metering head 45 and the bottle 46, once connected with each other, remain permanently connected. The system 45/46 can, e.g., tilt about an axle provided in the bottom region of the bottle 46.

Figure 2:
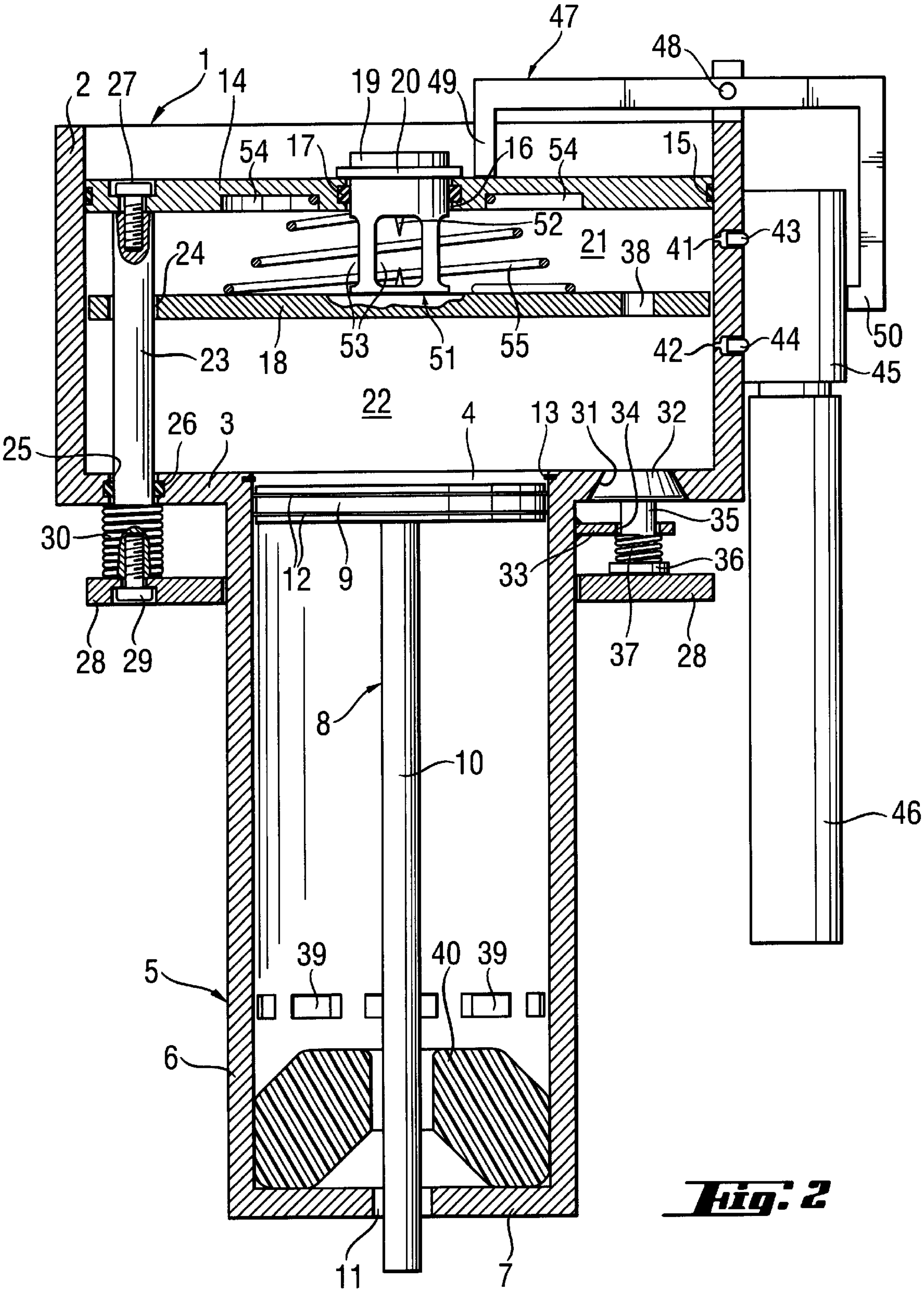
FIG. 2 an axial cross-sectional view of the tool shown in FIG. 1 with an expanded combustion chamber.

FIG. 2 shows the setting tool with the combustion chamber 1 in its expanded condition, i.e., with the expanded fore-chamber 21 and main chamber 22. The displaced positions of the movable wall 14 and the separation plate 18 are established when the driving ring 28 impacts the shoulder 36, closing the valve 31, 32. The opening 31 and the valve tappet 32 have conical circumferential surfaces narrowing in the direction of the combustion chamber 1, so that a stop is formed. As it has been discussed previously, the distance of the separation plate 18 from the movable wall 14 is determined by the distance of the shoulder 20 from the separation plate 18. In this position of the movable wall 14 and the separation plate 18, the radial openings 41, 42 lie against the fore-chamber 21 and the main chamber 22, respectively.

The lug 19 forms, in its region adjacent to the separation plate 18, an ignition cage 51 for receiving an ignition element 52. The ignition element 52 serves for generating an electrical spark for the ignition of the air-fuel gas mixture in the fore-chamber 21. As it will be described in more detail below, the ignition device 52 is located in the central region of the cage 51 having openings 53 formed in the cage circumference. Through those openings 53, the burning gas exit from the ignition cage 51 into the fore-chamber. The ignition device 52 can include; e.g., two electrodes.

As further shown in FIGS. 1–2, the surface of the movable wall 14, which faces the separation plate 18, has an annular recess 54 concentric with the central opening 16. A helical spring 55 extends in the recess 54. In the collapsed condition of the combustion chamber, the spring 55 is completely compressed and is housed in the recess 54, so that the movable wall 14 can lie on the separation plate 18. In the expanded condition of the combustion chamber, which is shown in FIG. 2, the spring 55 is expanded or relieved to a most possible extent and is supported, at one of its end, in the recess 54 of the movable wall 14 and, at another of its end, against the separation plate 18. In order to prevent the spring 55 from occupying an eccentric position, means (not shown) for securing respective ends of the spring 54 to movable wall 14 and the separation plate 18 can be provided.

The helical spring 55 is arranged concentrically with the cage 51 in a spaced relationship thereto. The helical spring 55 lies between the ignition device cage 51 and the openings 38 in the separation plate 18. The helical spring 55 is formed of fine wire and forms an obstructions for a flame front that expands radially, upon ignition of the fuel gas mixture with the ignition device, from the cage 51. Local turbulence of the expandable flame front is created in the region of the helical spring 55. This local turbulence provides for better intermixing of the fuel gas mixture in the fore-chamber 21. This results in a more rapid combustion of the fuel gas mixture in the fore-chamber 21 and, therefore, in an increase of the speed of the radially expanding flame front that remains substantially laminar.

Below, the operation of the setting tool, shown in FIGS. 1–2, will be described in detail.

FIG. 1 shows the condition of the combustion chamber 1 in the off-position of the setting tool. The combustion chamber 1 is completely collapsed, with the separation plate lying on the bottom 3 of the combustion chamber 1 and the movable wall 14 lying on the separation plate 18. The piston 8 is in its rearward off-position so that practically no space remains between the piston 8 and the separation plate 18 if one would disregard a small clearance therebetween. The position, in which the movable wall 14 lies on the separation plate 18, results from the compressing spring 30 biasing the drive ring 28 away from the bottom 3, and the ring 28 pulls with it the movable wall 14 via the drive rods 23. In this position, the drive ring 28 is spaced from the shoulder 36 of the valve tappet 32, and the compression spring 37 keeps the valve tappet 32 outside of the opening 31 so that the opening 31 remains open. The system metering head 45/bottle 46 is pivoted away from the wall 2 of the combustion chamber 1, with the outlet nipples 43, 44 being released and the metering valve (no shown) being closed. The helical spring 55, which is formed as a compression spring is entirely compressed and is entirely housed in the recess 54.

When in this condition, the setting tool is pressed with its front point against an object, the fastening element should be driven in. A mechanism, not shown, applies pressure to the drive ring 28 displacing it in the direction of the bottom 3 of the combustion chamber 1. This takes place simultaneously with the setting tool being pressed against the object. Upon displacement of the drive ring 28 toward the bottom 3, the movable wall 14 is lifted of the separation plate 18 and, after engaging the shoulder 20, lifts the separation plate 18 with it. Upon engagement of the shoulder 20 by the movable wall 14, the fore-chamber 21 is completely expanded but does not yet occupy its operational position inside the combustion chamber 1. During the expansion of the fore-chamber 21, the air can already been aspirated into the fore-chamber 21 through the ventilation opening 31 and through one or more of openings 38 formed in the separation plate 18 and overlapping the ventilation opening 31.

Upon the setting tool being further pressed against the object, the drive ring 28 is moved closer to the bottom 3,and the movable wall 14 is moved further upward, lifting the separation plate 18 from the bottom 3. As a result, the main chamber 22 likewise expands and is aerated through the ventilation opening 31, with the fore-chamber 21 being aerated through all of the openings 38.

When the movable wall 14 and the separation plate 18, in their movement upward, move past the radial openings 41, 42, in principle, the injection of metered amounts of liquefied fuel gas into the fore-chamber 21 and the main chamber 22 can begin. The injection starts when the movable wall engages the end 49 of the stirrup 47 which pivots in a clockwise direction about the pivot point 48, with the other stirrup end 50 pressing the metering head 45 toward the cylindrical wall 2. Upon the metering head 45 being pressed against the cylindrical wall 2, the outlet nipples 43, 44 move inward, opening the respective metering valves. The liquefied gas is injected into the fore-chamber 21 and the main chamber 22. Thereafter, a further lifting of the movable wall 14 and the separation wall 18 is necessary to bring them into their end positions in which they are locked. The possible residual pivotal movement of the stirrup 27 is compensated by the outlet nipples 43, 44 being moved a small distance further inward into the metering head 45.

In the last part of the displacement of the moving wall 14 and the separation plate 18 to their end positions, the valve tappet 32 is pushed into the opening 31, closing the same, as a result of the drive ring 28 engaging the shoulder 36. The helical spring 55 is completely expanded and surrounds the cage 51, extending between the movable wall 14 and the separation plate 18.

The positions of the movable wall 14 and the separation plate 18 in the completely expanded condition of the fore-chamber 21 and the main chamber 22 is shown in FIG. 2. In these positions, the movable wall 14 and the separation plate 18 can be locked. The locking takes place upon actuation of an appropriate lever or trigger of the setting tool. Upon actuation of the trigger, the movable wall 14 and the separation plate 18 become locked. The locking of the separation plate 18 and the movable wall 14 can be effected by locking of the drive ring 28. Shortly after the locking of the movable wall 14 and the separation plate 18, a ignition spark is generated by the actuation of the ignition element 52 inside the cage 51. A mixture of air and the fuel gas, which was formed in each of the chambers 21 and 22, is ignited. First, the mixture starts to bum laminary in the fore-chamber 21, and the flame front spreads rather slowly in a direction of the openings 38. First, the laminary flame front comes into contact with the helical spring 55 and is locally reflected or deviated. This increases the inter-mixing rate of the air-fuel gas mixture, resulting in a more rapid combustion and in an increased velocity of the laminar front, and the flame front reaches the opening 38 more rapidly. The unconsumable air-fuel gas mixture is displaced ahead and enters, through the openings 38, the main chamber 22, creating there turbulence and pre-compression. When the flame front reaches the openings 38, it enters the main chamber 22, due to the reduced cross-section of the openings 38, in the form of flame jets, creating there a further turbulence. The thoroughly mixed, turbulent air-fuel gas mixture in the main chamber 22 is ignited over the entire surface of the flame jets. It burns with a high speed which significantly increases the combustion efficiency.

The combustible mixture impacts the piston 8, which moves with a high speed toward the bottom 7 of the guide cylinder 5, forcing the air from the guide cylinder 5 out through the openings 39. Upon the piston plate 9 passing the openings 39, the exhaust gas is discharged there through. The piston rod 10 effects setting of the fastening element. After setting or following the combustion of the air-fuel gas mixture, the piston 8 is brought to its initial position, which is shown in FIG. 2, as a result of thermal feedback produced by cooling of the flue gases which remain in the combustion chamber 1 and the guide cylinder 5. As a result of cooling of the flue gases, an underpressure is created behind the piston 8 which provides for return of the piston 8 to its initial position. The combustion chamber 1 should remain sealed until the piston 8 reaches its initial position, shown in FIG. 2.

After return of the piston 8 to its initial position, the movable wall 14 and the separation plate 18 are unlocked. The compression springs 30 bias the drive ring 28 away from the bottom 3 of the combustion chamber 1, and the drive ring 28 releases the valve tappet 32, and the compression spring 39 pushes the valve tappet 32 out of the opening 31, opening same. Upon being displaced away from the bottom 3 by the compression springs 30, the drive ring 28 pulls the movable wall 14 with it toward the bottom 3. Later, as the drive ring 28 moves further away from the bottom 3, the movable wall 14 abuts the separation plate 18, pushing it toward the bottom 3. Upon movement of the movable wall 14 and the separation plate 18 toward the bottom 3, the exhaust gases in the fore-chamber 21 are pushed through the openings 38 in the separation plate 18 into the main chamber 22 and therefrom, together with the exhaust gases formed in the main chamber 22, through the opening 31 outside. Finally, the separation plate 18 lies again on the bottom 3, and the movable wall 14 lies on the separation plate 18. The combustion chamber 1 becomes completely collapsed and free of exhaust gases. The aeration process can start again.

Figure 3A:
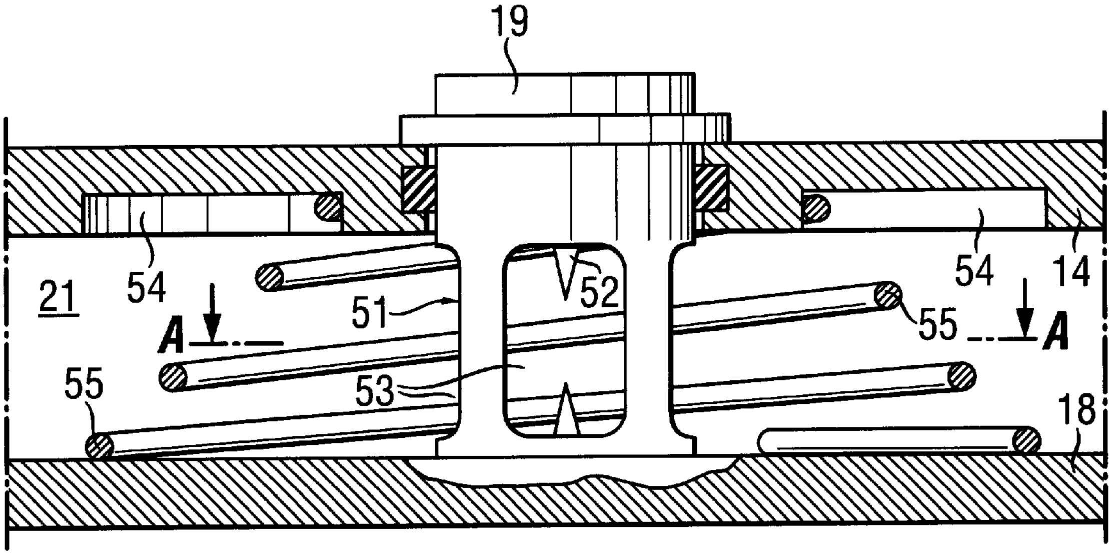
FIG. 3*a* a side view of the ignition device of the combustion chamber shown in FIGS. 1–2 together with a turbulence-creating device.
Figure 3B:
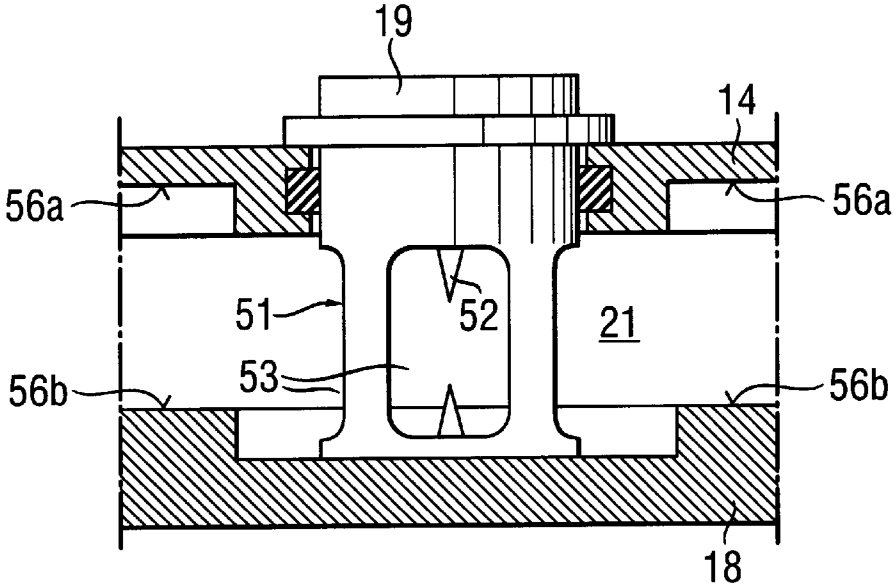
FIG. 3*b* a side view similar to that of FIG. 3*a* but with another embodiment of a turbulence-creating device.

FIGS. 3–5 show the construction of the cage 51 for the ignition device 52. In the expanded condition of the fore-chamber 21, the cage 51 is located between the movable wall 14 and the separation plate 18, as shown in FIGS. 3*a*–3*b*. The cage 51 is formed as a cylindrical body and has an inner chamber in which the ignition device 52 for generating an electrical spark is located. The cylindrical wall of the cage 51 has, in the embodiment of the tool described here, four outlet openings 53 having an elongate shape, with the longitudinal direction of the openings 53 being perpendicular to the movable wall 14 and the separation plate 18. The openings 53 have, at least in their central region, a width such that the wall surfaces 53*a,* which limit the opening 53, are so arranged that the walls 53*a* of adjacent openings 53 adjoin each other at a right angle. Flame expands from the center of the cage 51 parallel to the movable wall 14 and the separation plate 18 and, therefore, does not impact the inner surfaces of the cage 51 which extend perpendicular to the propagation direction of the flame front. As a result, a reflection of the flame back to the cage center is prevented. This favorable influences the laminar flow of the flame which expands radially shortly after living the cage 51. The cage 51, as shown in FIG. 3*a,* is in the center of the helical spring 55 which concentrically surrounds the cage 51 in a spaced relationship thereto. The cage 51 is supported against the movable wall 14 and the separation plate 18.

FIG. 6 shows a plan view of the separation plate 18 according to another embodiment. In this embodiment, no cage 51 is provided. Only, the ignition device 52, which is indicated with arrows, is located in the center of the cage 51. The flame front F, which is formed at a distance from the ignition device 52, is locally swirled by the helical spring 55, but remains substantially laminar when it reaches the openings 38 in the separation plate 18. As an ignition device 52, e.g., a spark plug can be used.

It should be clear that instead of the helical spring 52, another swirling means can be used for creating a local turbulence which can be arranged between the ignition device 52 and the openings 38. E.g., as swirling means, steps 56*a*/56*b,* which are shown in FIG. 3*b,* can be used. The steps 56*a*/56*b* can be formed, respectively, in the movable wall 14 and the separation plate 18. Advantageously, the steps 56*a*/56*b* are inversely arranged in the movable wall 14 and the separation plate 18, which provides for complete abutment of movable wall 14 and the separation plate 18. The steps 56*a*/56*b* permit to achieve the same effect as the spring 55.

Though the present invention was shown and described with references to the preferred embodiments, such embodiments are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A combustion-engined tool, comprising two opposite combustion chamber walls (14, 18); and an ignition device (52) arranged between the two opposite combustion chamber walls (14, 18) for igniting a fuel gas mixture occupying space between the two walls (14, 18), one (18) of the two walls having a plurality of openings (38) spaced from the ignition device; and means located between the ignition device (52) and the openings (38) formed in the one of two walls (18) for localized swirling a laminary expanding flame front formed upon ignition of the fuel gas mixture with the ignition device.

2. A combustion-engined tool according to claim 1, wherein the swirling means (55) is formed as a separate element.

3. A combustion-engined tool according to claim 2, wherein the swirling means is formed at least partially of wire.

4. A combustion-engined tool according to claim 1, wherein the swirling means is formed as a spring (55) surrounding the ignition device (52) and supported at its opposite ends against the two walls (14, 18), respectively.

5. A combustion-engined tool according to claim 4, wherein the spring is formed as a helical spring.

6. A combustion-engined tool according to claim 4, wherein the spring is formed as a compression spring.

7. A combustion-engined tool according to claim 1, wherein the swirling means (56*a,* 56*b*) forms part of at least one of the two combustion chamber walls (14, 18).

8. A combustion-engined tool according to claim 7, wherein the swirling means (56*a,* 56*b*) is formed by structural modification of the at least one of the two walls.

9. A combustion-engined tool according to claim 8, wherein the swirling means (56*a,* 56*b*) comprises step means formed in the at least one of the two walls.

10. A combustion-engined tool according to claim 8, wherein the steps means (56*a,* 56*b*) comprises inverse steps (56*a,* 56*b*) formed in both of the combustion chamber walls (14, 18), respectively.

11. A combustion-engined tool according to claim 1, further comprising a cage (51) surrounding the ignition device (52) and having openings (53) in the circumferential wall thereof; and wherein the swirling means (55, 56*a,* 56*b*) is located between the cage (51) and the openings (38) of the one of the two walls (18).

12. A combustion-engined tool according to claim 11, wherein the openings (53) in the circumferential wall (51) of the cage are angularity equidistantly spaced.

13. A device according to claim 11, wherein the cage (51) is formed as a hollow cylinder, a longitudinal axis of which extends transverse to the combustion chamber walls (14, 18).

14. A combustion-engined tool according to claim 11, wherein the cage (51) forms part of a lug (19) connected with one (18) of the two combustion walls (14, 18) and extends through an opening (16) formed in another (14) of the two combustion chamber walls (14, 18).

15. A combustion-engined tool according to claim 11, wherein wall sections (53*a*) of a cage wall surrounding adjacent cage openings (53) abut each other at inner ends thereof.

* * * * *